ANVIL CONSTRUCTION

Filed May 4, 1955 5 Sheets-Sheet 1

Inventors
Harry E. Dow
Raymond P. Legro
By their Attorney

ANVIL CONSTRUCTION

Filed May 4, 1955 5 Sheets-Sheet 2

Inventors
Harry E. Dow
Raymond P. Legro
By their Attorney

ANVIL CONSTRUCTION

Filed May 4, 1955 5 Sheets-Sheet 3

Inventors
Harry E. Dow
Raymond P. Legro
By their Attorney

ANVIL CONSTRUCTION

Filed May 4, 1955

5 Sheets-Sheet 4

Inventors
Harry E. Dow
Raymond P. Legro
By their Attorney

ANVIL CONSTRUCTION

Filed May 4, 1955 5 Sheets-Sheet 5

Inventors
Harry E. Dow
Raymond P. Legro
By their Attorney

United States Patent Office 2,758,303

Patented Aug. 14, 1956

2,758,303

ANVIL CONSTRUCTION

Harry E. Dow, Beverly, and Raymond P. Legro, Swampscott, Mass., assignors to United Shoe Machinery Corporation, Flemington, N. J., a corporation of New Jersey Application May 4, 1955, Serial No. 505,914

6 Claims. (Cl. 1—102)

This invention relates to inserting machines of the type employing anvils, and more particularly to the provision in such machines of improved anvil constructions adapted to serve as indicators or test means in addition to performing the function of effecting assembly by the bending of connector elements such as leads or prongs. The invention is herein illustrated as applied to mechanism for assembling electronic components with wiring boards, though it will be appreciated that in certain respects the invention is not thus limited in use but may well have application in various types of inserting machines and regardless of whether the work operated upon is electrical or nonelectrical in character. Since the anvil mechanism may operate upon various types of terminals, tabs, and other connective elements as well as upon leads, the term "lead" or "leads" is used herein in a comprehensive sense.

In a copending application bearing Serial No. 458,312, and filed September 27, 1954, in the names of Leon D. Alderman, Charles P. Cardani, Edwin S. Kent, and Henry B. Kimball, various novel features in machines for cutting, forming and fastening electronic components are disclosed and claimed. One of these improvements relates to the provision in such a machine of an anvil having spaced clinching terminals respectively arranged to be engaged by the leads of a component when they have been thrust endwise through a chassis by a driver bar, and an electrical circuit including said anvil terminals for controlling operation of said driver bar. The purpose of that particular organization as therein fully described is to insure that if a lead fails to be inserted by the machine as required to place a component for effective electric connection with a circuit, for example a circuit printed on a wiring board, the driver bar will thereupon automatically be prevented from recycling and hence a defective assembly can be corrected at once and further defects will be avoided. This feature is useful when the inserting machine is being operated by itself under manual control and is especially valuable if the machine is being operated in a series of automatic machines all working simultaneously to install parts of an assemblage. As set forth in the above-cited application, the circuit through which the recycling of the driver bar is effected is closed across the anvil terminals by the driver bar itself, thus permitting its retraction only after its full inserting stroke. Accordingly, the arrangement there is such that the lead legs of an inserted component and the driver bar when bridging these legs are normally required to carry electrical energy for the time interval during which a test for lead insertion is being performed. That system has been found normally to operate satisfactorily when inserting the leads of many different electrical components (and likewise will work well in checking for insertion of other metallic objects, for example, fasteners, whether of single or multi-prong shapes, such as staples). Experience has shown that the prior construction briefly described is not entirely satisfactory. For instance, in checking for insertion of all types of components, fasteners etc., its use may result in damage to delicate and sensitive elements having insertable prongs or critical body portions which are incapable of safely carrying the voltages which may be impressed on the control circuit from common commercial sources. Moreover, in order better to clinch leads or prongs in the restricted space that may be available for the purpose in some assemblages, especially on wiring boards, complete control of the direction of clinching to avoid unintended electrical contacts is highly desirable.

In view of the foregoing, a general object of this invention is to provide in a lead or prong inserting machine an improved anvil construction capable not only of securing inserted leads or prongs effectively but also of automatically performing one or more additional control functions without harm to the leads or prongs, or to the article to which they may be attached. Such further actions, for example, may be characterized as checking for insertion of the leads or prongs, testing for their protrusion from a chassis by a predetermined amount, and automatically signalling for interrupted or uninterrupted cyclical operation of the machine or some portion thereof (according to whether insertion has occurred) by means of an electric control circuit that is safely and reliably governed by anvil engagements with the inserted leads or prongs.

In accordance with the object just stated and as a feature of the invention, the illustrative anvil mechanism herein shown comprises individually depressible terminals respectively mounted to be engaged by a lead inserted through a chassis, and an electric circuit arranged to be closed by said terminals when the latter have been engaged by the inserted leads respectively, said circuit being electrically isolated from said terminals and being adapted to control operation of at least one part of said machine. Without departing from the scope of the invention, and depending largely on the nature of the particular job (i. e. connective element) at hand, mountings of anvil terminals may differ considerably in detail, those selected for illustration herein being intended (1) to detect insertion of the formed wire leads of an originally coaxial component through holes in a wiring board, (2) to signal after such insertion for return to starting position of an operating instrumentality, for instance a reciprocable driver bar, and (3) if desired, to provide for clinching movement of the terminals only after both leads are inserted and protrude a predetermined amount from the wiring board. At no time is an anvil terminal of the improved anvil mechanism or any part of the electronic componet being applied required to carry electrical energy or become a part of the control circuit. In one exemplary arrangement each of the lead-depressed anvil terminals actuates a microswitch, both of the microswitches being connected in series in the mentioned control circuit. In another and alternate arrangement, both depressible anvil terminals are so mounted that they must both be depressed by inserted leads before they can actuate a single microswitch which closes the control circuit.

Another feature of the invention resides in the provision in an inserting machine of an anvil having individually rotatable clinching terminals that are thus adaptable to insure clinching of each lead or prong in any desired radial direction. Moreover, the anvil mounting these terminals is also rotatable about an axis substantially parallel with those of the terminals to position them easily for operation on differently oriented components. Further novelty is to be recognized in an economical anvil terminal formed from expendable rod stock and having a lead engaging end shaped to yield a directed clinch when the terminal and the lead are relatively moved together endwise.

The above and other features of the invention, together with various novel details of constructions and combinations of parts will now be more particularly described in connection with an illustrative embodiment and with reference to the accompanying drawings thereof, in which.

Figure 1:
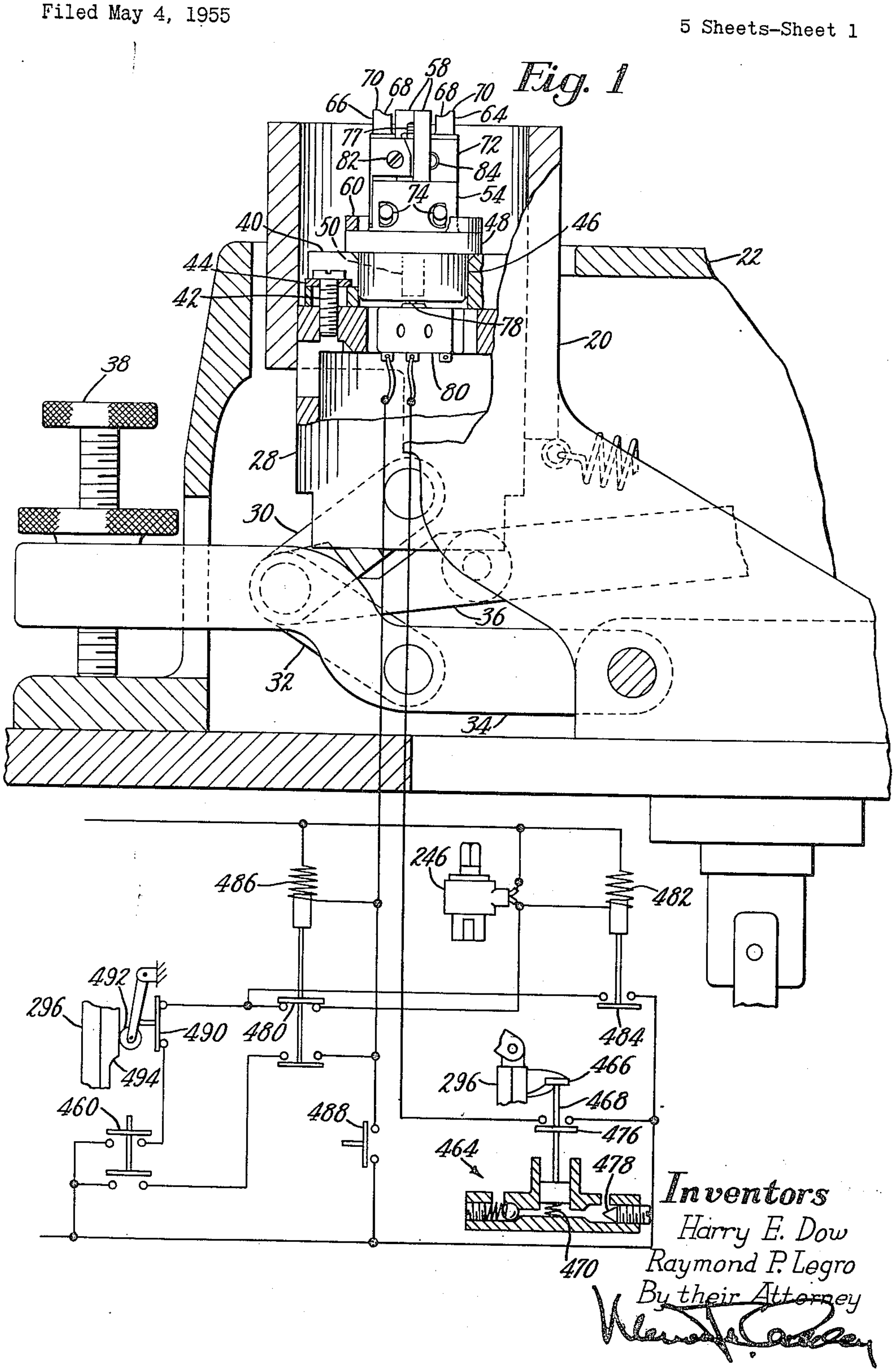
Fig. 1 is a side elevation, largely in section and with portions broken away, of part of the base of a component inserting machine such as disclosed in the copending application referred to and having anvil mechanism illustrative of the invention, a control circuit governed by this mechanism being shown schematically and for the most part similar to the circuit diagramed in said application.
Figure 2:
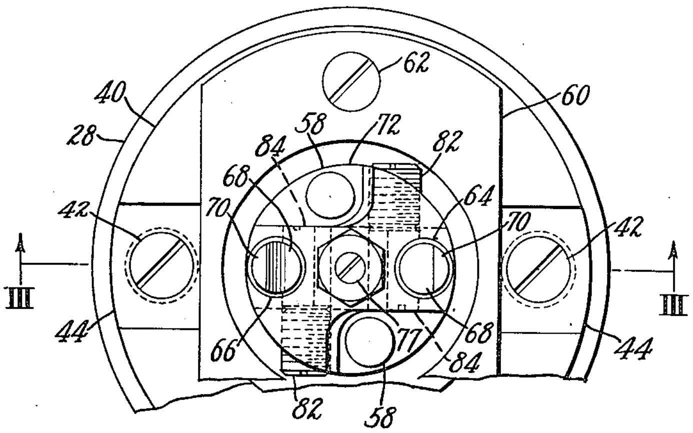
Fig. 2 is a plan view of the anvil structure shown in Fig. 1.

The anvil construction shown in Figs. 1–9 inclusive, as well as the subsequently described alternate arrangement shown in Figs. 10–12 inclusive, is disposed for vertical movement within a housing 20 (Fig. 1) fixedly supported in a base 22 of a machine primarily intended for inserting the leads of coaxial type electronic components 24 (one shown in Fig. 6) through preformed holes in a chassis, for example, a wiring board 26 bearing a printed circuit (not shown). The wiring board is held stationary during component insertion by means not herein shown. A hollow cylindrical upper portion of the housing 20 slidably receives a hollow cylinder 28 (Figs. 1, 3 and 8) that is adapted to carry the anvil mechanism to be described. Any suitable means may be used to move the cylinder 28 heightwise in appropriate time relation with the inserting mechanism partially shown in Figs. 6 and 7 and comprising a driver bar 27 and outside formers 29 cyclically operable in the head (not shown) of the machine to place a component on the wiring board 26 with its leads thrust therethrough, a toggle actuating linkage substantially such as described in the above-mentioned application sufficing for present purposes. Thus, the cylinder 28 is connected to an upper end of a toggle link 30, the lower end thereof forming a knee-joint with a toggle link 32. For a reason to be mentioned the latter is pivotally carried at its lower end by a lever 34 fulcrumed at one end on the housing 20, the toggle being power actuated by parallel operating bars 36 (one shown in Fig. 1) to reciprocate the anvil mechanism heightwise. The lever 34 threadably receives an adjusting screw 38 by which the upper limit of the operating stroke of the anvil mechanism may be modified if necessary or desirable.

For supporting the anvil mechanism about to be described an annular bearing 40 (Figs. 1 and 8) is secured to the top of the cylinder 28 by screws 42, 42 (Fig. 2) respectively recessed in oppositely disposed slots formed in the bearing 40 and respectively extending through a flat insert 44 and into the cylinder. A cylindrical member 46 having its lower end nested in the bearing 40 is formed with a collar 48 that rests on the bearing. The member 46 is bored slidably to receive a vertical switch-operating plunger 50 that is normally held in raised position by a compression spring 52 confined endwise by the member and a head on the plunger. Upstanding spaced segmental portions 54, 56 (Fig. 8) of the member 46 are each vertically bored to accommodate by press fit the stem of a work-supporting pin 58. As herein shown (Figs. 6 and 7) the flat tops of the pins 58 are thus arranged to engage the underside of a wiring board 26 adjacent to its lead-receiving holes, the pins thereby protecting the board against excessive deflection and strain during component insertion. A retaining plate 60 (Figs. 2, 4, 5 and 8) overlying the collar 48 is secured to the bearing 40 by screws 62, 62, the latter being loosened when it is desired to rotate the member 46 to adjust the position of the pins 58 and a pair of anvil-clinching terminals 64, 66 (Figs. 1, 3 and 6) depressibly mounted as will next be described.

Figure 3:
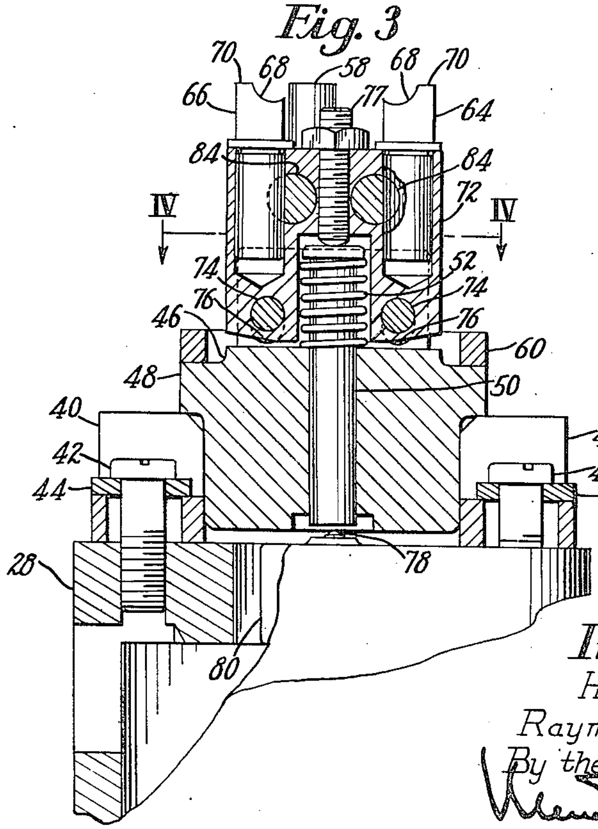
Fig. 3 is a section taken on the line III—III of Fig. 2, the anvil terminals being shown in their normal rest position.
Figure 4:
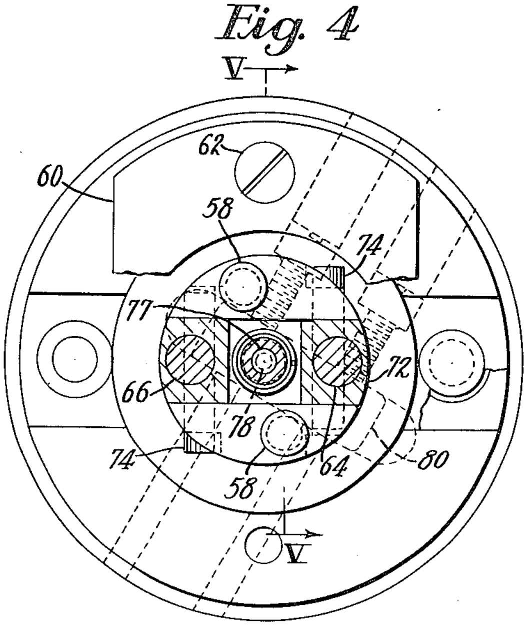
Fig. 4 is a section taken on the line IV—IV of Fig. 3.
Figure 5:
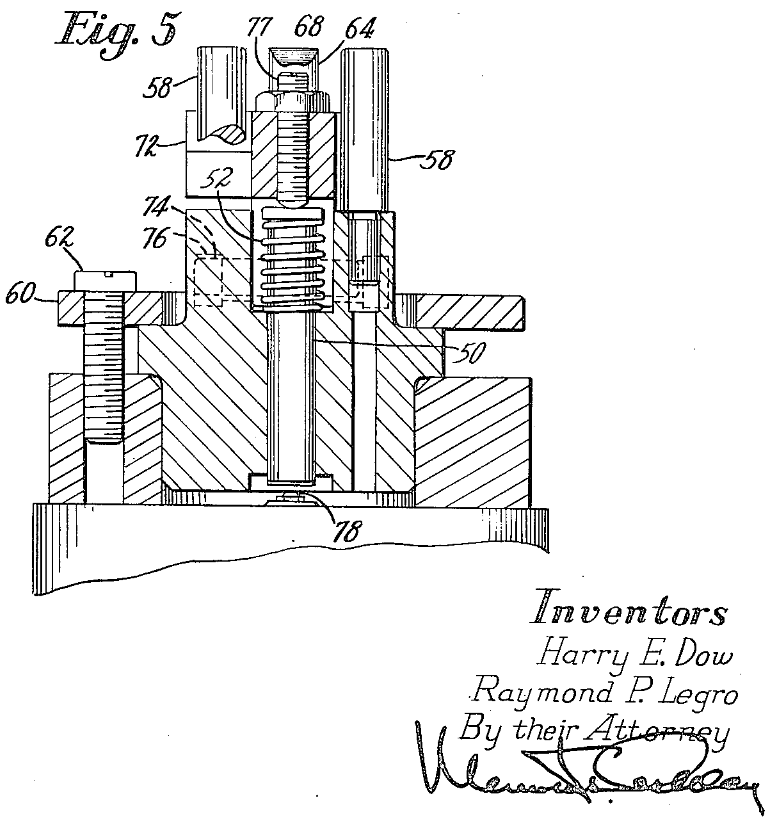
Fig. 5 is a section taken on the line V—V of Fig. 4.
Figures 6, 7, 8, 9:
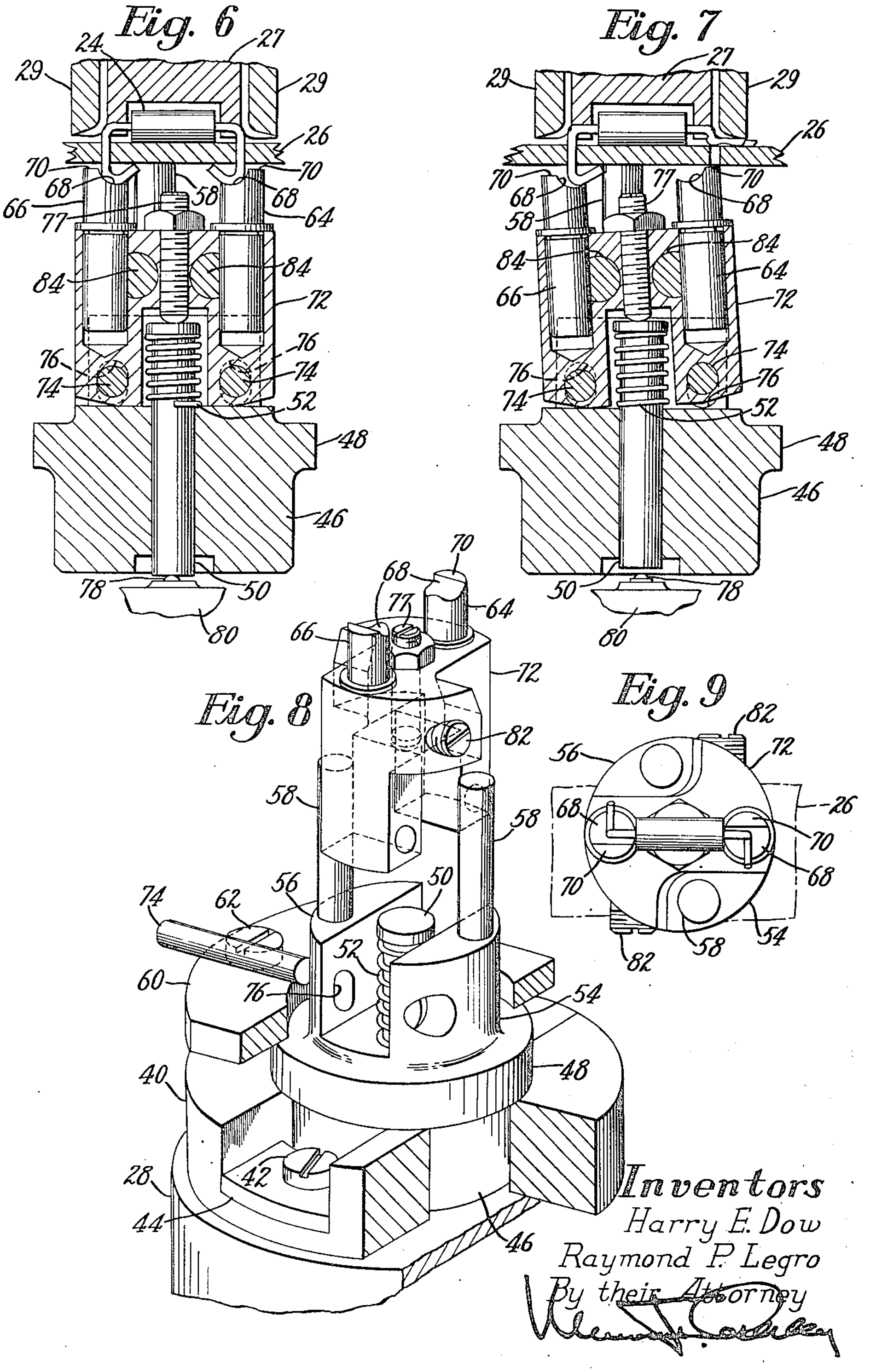
Fig. 6 is a section corresponding with portions of Fig. 3, but showing the terminals depressed by component leads inserted through a wiring board to close a control circuit switch, the inserting instrumentalities corresponding to those disclosed in said copending application.
Fig. 7 is a view corresponding with Fig. 6, but illustrating the different positions of parts when a "miss" or non-inserted lead fails to close the control switch.
Fig. 8 is a perspective view of the anvil mechanism with parts broken away and exploded to indicate construction.
Fig. 9 is a plan view of an inserted component with its leads clinched in different directions as determined by anvil terminals adjusted about their respective axes.

The terminals 64, 66 may be economically formed from expendable rod stock, their clinching ends respectively having lead directing grooves or, as shown herein, arcuate lead-engaging portions 68 (Figs. 6 and 7) and flats 70 which normally lie substantially in the plane containing the tops of the pins 58. The terminals are affixed in vertical bores formed in a depressible holder or cap 72 (Figs. 1 and 8). The latter has depending leg portions provided with rounded rocker ends and is bored transversely to receive pins 74, 74, respectively, that are movable vertically in slots 76 extending heightwise in the segments 54, 56. As shown in Fig. 3, the spring 52 normally acts through the plunger 50 and a set screw 77 engageable therewith and adjustably threaded in the cap 72 yieldably to lift the latter to a position determined by engagement of the pins 74, 74 with the upper ends of the slot 76. By means of the screw 77 the normal or initial heightwise position of the plunger 50 may be regulated with respect to a nonconducting, spring-backed, switch-operating button 78 (Figs. 3 and 4) arranged to be actuated thereby and mounted in a microswitch 80 (Figs. 1, 3 and 5), the latter being affixedly supported relatively to the cylinder 28. The initial heightwise position of the screw 77 accordingly determines the extent of effective downward displacement required to be imparted to both of the terminals 64, 66 by inserted leads before the switch 80 will be operated, the arrangement being such that insertion of but one lead and non-insertion of the other (see Fig. 7) effects a rocker movement of the cap 72 without sufficient downward displacement of the plunger 50 to operate the switch. The limit of depression of the cap, and hence of the terminals, is determined by its engagement with the cylindrical member 46.

To permit individual positioning and clamping of the terminals 64, 66 with respect to their axes and thus enable leads to be directed as desired or necessary during their clinching, the cap 72 is provided with parallel, horizontal bores each of which threadedly receives a screw 82 for abutting endwise a cylindrical insert 84 having a semi-cylindrical recess adapted to bear on a terminal 64 or 66. Upon relieving endwise pressure of a screw 82 on an insert 84, a terminal may be turned to provide directional clinching such as shown, for example, in Fig. 9. Each lead may thus be selectively directed as desired throughout 360°, its terminal being suitably turned, for example, so that a clinched lead will avoid interference with other circuit parts.

In operating the anvil mechanism shown in Figs. 1–9 inclusive, anvil terminals of any appropriate shape may be used and it will be understood that control circuits differing from that illustrated in Fig. 1 may be substituted. Since the control circuit diagrammed in Fig. 1 is substantially as shown in Fig. 12 of the Alderman et al. application, only a brief explanation of it will now be made by way of illustration of the control possibilities of the anvil structure, corresponding circuit elements bearing like reference characters for easy comparison. Machine insertion of the components 24 as shown in Figs. 6 and 7 is accomplished by the down stroke of the driver bar 27 and the outside formers 29, as effected by the powered upstroke, against the resistance of a return spring (not shown) of a link 296 (an intermediate portion of this link is shown on the left in Fig. 1 and an upper end is separately indicated on the right). A starting switch 460 is actuated to close a circuit through a normally closed, lever-operated switch 490 and a relay contact 480 thus to energize the solenoid of a valve 246 and cause a motor (not shown) to force the link 296 upwardly whereby the component leads are thrust endwise in a direction intended to insert them in the wiring board holes. The switch 490 opens after the start of the machine as permitted by a cam roll 492 cooperative with a cam 494 formed on the link 296 and accordingly breaks the starting circuit to prevent recycling of the machine by accidental actuation of the switch 460 before the driver bar has completed an operating and return stroke. The solenoid of the valve 246 is maintained energized until the driver bar completes its inserting stroke. The switch 490 opens since the starting switch 460 is also effective simultaneously to energize a solenoid 482 that closes a contact 484 to provide a live circuit through the relay contact 480.

As above noted, in completing the operating down stroke if both leads find their wiring board holes and are thrust therethrough, they engage the clinching portions 68, 68 to depress the terminals 64, 66 simultaneously, the cap 72, its screw 77 and the plunger 50 thereby being displaced as a unit downwardly and sufficiently to depress the button 78 and hence close the microswitch 80. After the leads protrude and have fully depressed the anvil terminals 64, 66 the latter are moved heightwise to effect clinching by means of the toggle-operating bars 36 being shifted to the right (as seen in Fig. 1). This shifting of the bars 36 may be effected, for example, by operative connection with the link 296 as disclosed in said copending application. The result of an effective insertion of both leads to close the switch 80 as shown in Fig. 6 is that a circuit is completed that energizes a solenoid 486 (Fig. 1) which breaks the contact 480, thereby permitting closure of the valve 246 and allowing the driver bar 27 and the formers 29, under influence of the return spring above referred to, to be retracted for recycling. A conventional time delay switch 464 controlling a contact 476 is provided to delay the return down-stroke of the link 296 in order to insure that the driver bar 27 is not prematurely raised at the instant of closing of the microswitch 80, but will permit complete lead clinching to be effected. Thus an arm 466 secured to the link 296 is arranged normally to engage the upper end of a piston rod 468 carrying the contact 476, a compression spring 470 urging the piston upwardly in a cylinder formed in the delay switch housing. The arrangement is such that the arm 466 rises faster than the piston rod 468 during the inserting stroke of the driver bar 27, the piston rising at an adjustable rate determined by the inflow of air into the switch housing, as controlled by a needle valve 478. By reason of the contact 476 holding open the microswitch 80 circuit even though the switch button 78 has just been depressed, clinching is completed before the contact 476 is lowered by the arm 466 to close the microswitch circuit effecting driver bar retraction.

If both leads fail to be inserted, or if either lead of a component fails to be inserted and hence to engage and depress its anvil terminal (the terminal 64 in Fig. 7 for example), it will be apparent that the plunger 50 cannot be depressed enough to operate the switch 80 and therefore the control circuit containing the switch cannot signal for the retraction of the driver bar 27. Upon detection in this manner of no components being installed or of one being defectively applied, a release switch 488 (Fig. 1) may be closed to energize the solenoid 486 and effect retraction of the driver bar and outside formers whereupon a component may be properly installed.

An alternate anvil construction in some respects similar to that just described but using two microswitches 92, 92 (Fig. 11) instead of the one designated 80 will now be explained with regard to those parts not common to both constructions, like parts bearing like reference characters. A cylindrical cap 94 rests on the annular bearing 40 after appropriate adjustment about a vertical axis and is clamped thereon by the plate 60. For backing a wiring board 26 a work support 96 having two oppositely disposed, upstanding projections 98, 98 is secured centrally in the top of the cap 94 by a screw 100. Oppositely disposed vertical bores formed in the cap 94 respectively receive depressible lead-clinching anvil terminals 102, 102, projections 104, 104 of the cap serving outwardly to shield the anvil terminals. Each of the terminals 102 has an inclined clinching surface 106, the surfaces 106 being shown herein as arranged to bend inserted leads toward each other during the clinching. As shown in Fig. 11 the terminals 102 are formed with slots 108, respectively, that receive the flat base of the work support 96, the upper surface of the latter thus acting as a stop in determining the lower limit of movement of the terminals 102 relatively to the cap 94. The terminals are normally yieldingly held in their raised positions and abutting the lower surface of the work support 96 by compression springs 110, 110 respectively bearing at their upper ends against a shoulder formed on the terminals and at their lower ends against a shoulder formed in the cap 94.

The switches 92, 92 are affixed to a web 112 depending from the cap 94 and are operated by nonconducting, spring-backed buttons 114, 116, respectively. The switches 92, 92 are connected in series and arranged to close an isolated electric control circuit upon minute depression of the buttons by means of force transmitted thereto by the leads as the latter are thrust against the respective terminals 102 to move them downwardly. For engaging the buttons 114, 116 each anvil terminal threadedly carries a nut 118 on which a contact 120 has been press-fitted, and a lock nut 122, by means of which the contacts can be secured in proper heightwise relation to the switch operating buttons. From the above it will be clear that the leads of a component must be thrust through a wiring board and project sufficiently therefrom to engage the two clinching surfaces 106 and thus depress the terminals a very slight amount but enough to close the control circuit by operating both buttons 114 and 116; the circuit is not effective if either lead of a component fails to be inserted or projects insufficiently.

Figures 10, 11, 12:
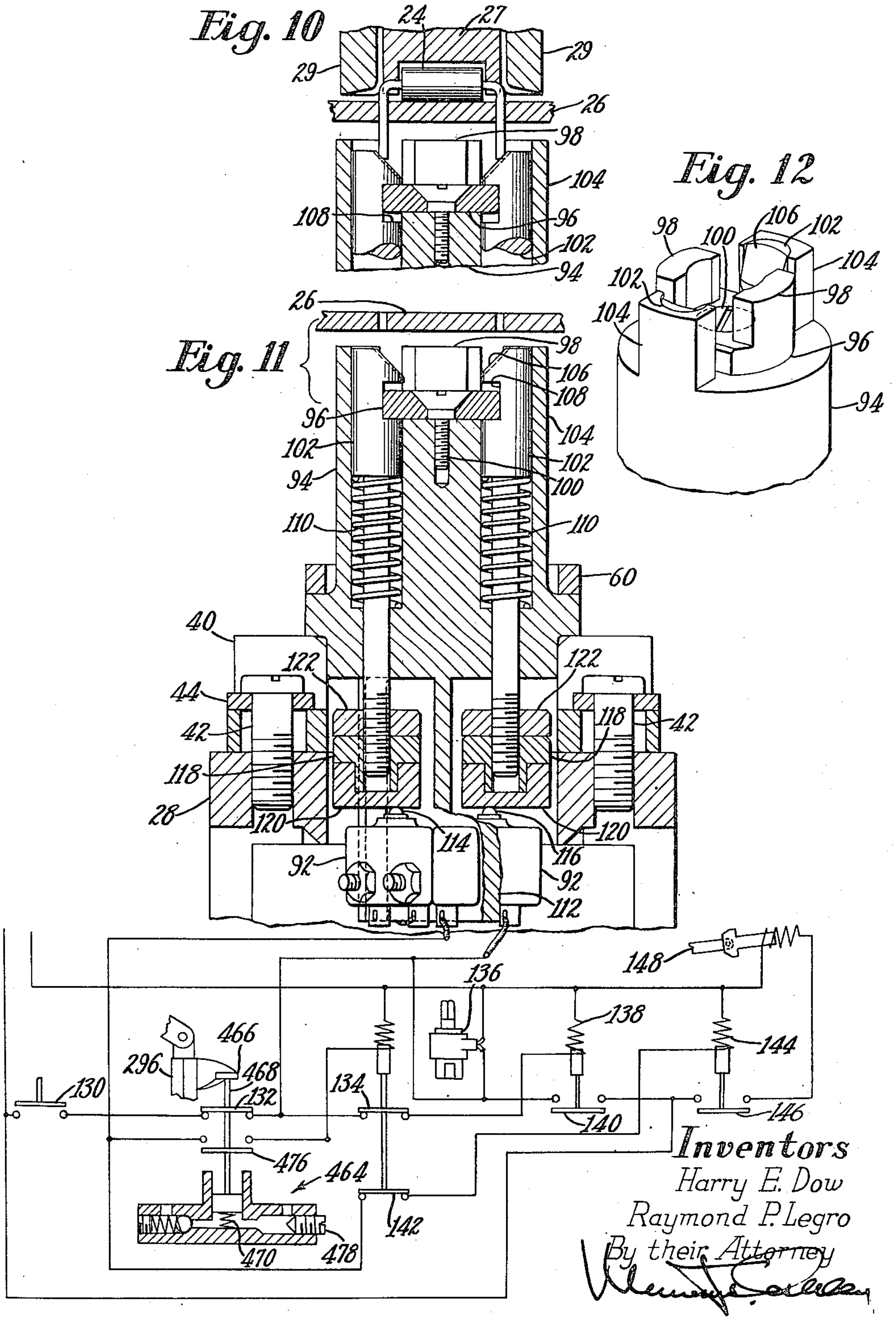
Fig. 10 is a section of the upper part of an alternate anvil and showing it in signaling position as imposed by inserted leads applied by a driver bar.
Fig. 11 is a view in elevation and largely in section of the modified anvil mechanism partly shown in Fig. 10 and now indicated in rest condition together with its wiring diagram, the latter being a modification of the diagram shown in Fig. 1.
Fig. 12 is a perspective view of the upper portion of the alternate anvil.

Referring more particularly to the diagrammatic portion of Fig. 11 for the purpose of explaining the somewhat different operation of the machine when fitted with the alternate anvil mechanism just described, a pushbutton starting switch 130 is actuated to close a circuit through a time delay contact 132 and a contact 134 to energize the solenoid of a valve 136 and a solenoid 138. The latter accordingly closes contacts 140 to maintain the valve 136 and the solenoid 138 energized when the switch 130 is released. The driver bar 27 upon this actuation of the valve 136 is caused to be moved downward, for instance by a motor as in the above-described case, to insert the leads as the link 296 is motor-driven upwardly. Providing that both leads have been inserted so as to depress the terminals as shown in Fig. 10, a circuit is thereby completed through the micro-switches 92, 92 and a contact 142 whereby a solenoid 144 is energized to close a contact 146 and operate anvil clinching mechanism, for example an anvil solenoid plunger 148 having operative connection with the toggle operating bars 36 shown in Fig. 1. (In this arrangement the bars 36 would not be mechanically connected to the link 296). Hence, assuming both leads of a component do protrude from the wiring board by a predetermined amount, an amount dependent upon appropriate initial heightwise adjustment of the screw 38 and the switch contacts 120, 120, a signal is effective to straighten the toggle 30, 32 to raise the cylinder 28 and the cap 94 with the anvil terminals and thus clinch the leads. The switches 92, 92 being in series, if either of them is not effective to signal because of failure of a lead to be inserted or to be inserted far enough, clinching does not occur and the machine ceases operation with the driver bar 27 in down position. The driver bar and outside formers back up the leads above the wiring board so that the leads when clinched are bent about the lower edges of the wiring board holes. As in the previously described anvil circuit of Fig. 1, the time delay mechanism 464 now operates to open the contact 132 and close contact 476 thereby opening contacts 134 and 142. The opening of the contacts 134 and 142 permits the retraction of the inserting instrumentalities and clinching terminals to their starting positions, and resets the time delay mechanism and recloses the contacts 134, 142.

Having thus described our invention, what we claim as new and desire to secure by Letters Patent of the United States is:

1. In an inserting machine, means for placing a component adjacent to one side of a work piece with the leads of said component thrust therethrough and protruding from the other side of the work piece, and anvil mechanism cooperative with said means and mounted for movement relative to said other side of the work piece for clinching the protruding portions of the leads in desired directions, said anvil mechanism including terminals corresponding in number to the leads to be clinched, and said terminals being individually rotatable about their respective axes and also adjustable as a unit about a common axis extending between said protruding lead portions.

2. A machine for securing on a workpiece a component having a lead comprising an instrumentality for placing the component on the workpiece with the lead thrust therethrough, an anvil engageable with that portion of the lead protruding from the workpiece to clinch the lead, and a circuit for controlling operation of the machine, said circuit being electrically isolated from the anvil and including a switch actuatable in response to said engagement of the anvil with said lead portion.

3. A machine for securing on a workpiece a component having a lead comprising means for placing the component on the workpiece with the lead inserted therethrough, a yieldable anvil terminal movably mounted on the opposite side of said workpiece from said means to bend and clinch the protruding portion of the lead, said terminal being disposed to be engaged and yieldingly displaced by the lead as it is being inserted, a circuit for controlling cyclical operation of said placing means and said terminal, and a switch in said circuit responsive to the displacement of said anvil terminal by the inserted lead.

4. A machine for securing on a workpiece a component having a plurality of leads comprising means for placing the component on the workpiece with said leads inserted therethrough, anvil mechanism movable toward and from the inserted leads to clinch them, said mechanism including a plurality of anvil terminals individually adjustable about their axes and corresponding in number to the leads to be clinched thereby, a holder in which said terminals are yieldably mounted, a circuit for controlling operation of the machine, and a switch in said circuit displaceable upon depression of said holder by more than one of said leads acting on its corresponding anvil terminals.

5. In a machine for securing spaced leads of a component with respect to a chassis, means for thrusting the leads through the chassis, anvil terminals yieldingly mounted and positioned to be depressed, respectively, by the portions of the leads protruding from the chassis, and a circuit electrically isolated from said terminals for controlling operation of the machine, said circuit including in series a switch for each anvil terminal and operable thereby.

6. In a machine for securing the spaced leads of a component with respect to a chassis, a reciprocable instrumentality for placing the component adjacent to the chassis and with its leads protruding therefrom, means for yieldably mounting anvil terminals a definite distance from the chassis, said terminals having clinching portions respectively disposed to be engaged and displaced by the protruding leads, and a circuit for actuating clinching movement of said terminals with respect to said leads while said instrumentality is in operative relation to the component, said circuit being energizable in response to a predetermined amount of displacement of said anvil terminals by the engagements of said leads therewith.

References Cited in the file of this patent

UNITED STATES PATENTS

| | | |
|---|---|---|
| 1,919,373 | Krantz | July 25, 1933 |
| 2,112,926 | Pankonin | Apr. 5, 1938 |
| 2,625,680 | Finn | Jan. 20, 1953 |